(12) United States Patent
Xu et al.

(10) Patent No.: US 10,478,855 B2
(45) Date of Patent: Nov. 19, 2019

(54) LINEAR VIBRATION MOTOR

(71) Applicant: AAC Technologies Pte. Ltd., Singapore (SG)

(72) Inventors: Hongfu Xu, Shenzhen (CN); Jinquan Huang, Shenzhen (CN); Fanghua Ling, Shenzhen (CN); Wenli Wang, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 384 days.

(21) Appl. No.: 15/652,668

(22) Filed: Jul. 18, 2017

(65) Prior Publication Data

US 2018/0297070 A1 Oct. 18, 2018

(30) Foreign Application Priority Data

Apr. 14, 2017 (CN) .................... 2017 2 0397130 U

(51) Int. Cl.
*H02K 33/00* (2006.01)
*B06B 1/04* (2006.01)

(52) U.S. Cl.
CPC ............. *B06B 1/045* (2013.01); *H02K 33/00* (2013.01)

(58) Field of Classification Search
CPC .................... H02K 33/00–35/06; B06B 1/045
See application file for complete search history.

(56) References Cited

U.S. PATENT DOCUMENTS

2012/0169151 A1* 7/2012 Dong .................... H02K 33/16
310/25
2017/0033657 A1* 2/2017 Mao ...................... H02K 33/16

* cited by examiner

*Primary Examiner* — Ramon M Barrera
(74) *Attorney, Agent, or Firm* — IPro, PLLC; Na Xu

(57) ABSTRACT

A linear vibration motor, including: a base, a vibrating unit, an elastic member, a first stopper and a second stopper. The elastic member includes two elastic members mutually spaced and arranged by stacking. Each elastic member includes a fixing arm fixed on the vibrating unit, two elastic arms bending and extending from the fixing arm, and two connecting arms respectively bending and extending from ends of the elastic arms, the connecting arms are respectively fixed on the base; the first stopper is fixed at a side of the fixing arm away from the vibrating unit; the second stopper is fixed on a side of the connecting arm close to the vibrating unit; the first stopper and the second stopper are mutually spaced and an orthographic projection of the first stopper along the vibrating direction at least partially falls into the second stopper.

9 Claims, 3 Drawing Sheets

LINEAR VIBRATION MOTOR

TECHNICAL FIELD

The present disclosure relates to a motor and, particularly, relates to a linear vibration motor used in field of mobile electronic products.

BACKGROUND

With the development of electronic technologies, portable consumption electronic products such as cellphone, handheld game player, navigation device or handheld multimedia entertainment device and the like are becoming more and more popular. Generally, these electronic products will use a linear vibration motor for system feedback, such as call prompt, message prompt, navigation prompt of a cellphone, vibration feedback of a game player etc. Such widespread application requires high performance and long service life of the vibration motor.

The linear vibration motor in the prior art includes a base having accommodating space, a vibrating unit located in the accommodating space, an elastic member which fixes and suspends the vibrating unit in the accommodating space, and a coil fixed at the base. The magnetic field generated by the coil interacts with the magnetic field generated by the vibrating unit, so as to drive the vibrating unit to move reciprocally and linearly to generate vibration. In order to increase elasticity of the elastic member, two elastic members are stacked in opposite directions and fixed at the base from two opposite sides of the vibrating unit. Each elastic member includes a fixing arm fixed at the vibrating unit and a connecting arm fixed at the base and respectively extending from two ends of the fixing arm.

However, in order to avoid from the direct collision of the vibrating unit with the base when the linear vibration motor is dropping off in the vibrating direction, two limiting blocks shall be fixed at the bottom portion of the base, so that the limiting blocks are respectively located at two sides of the vibrating unit along the vibrating direction. However, such a structure needs additional limiting blocks and their welding process, which leads to low production efficiency and high cost.

Therefore, a new linear vibration motor is necessary to solve the above-mentioned problems.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will be further illustrated as follows with reference to the drawings and embodiments.

Figure 1:
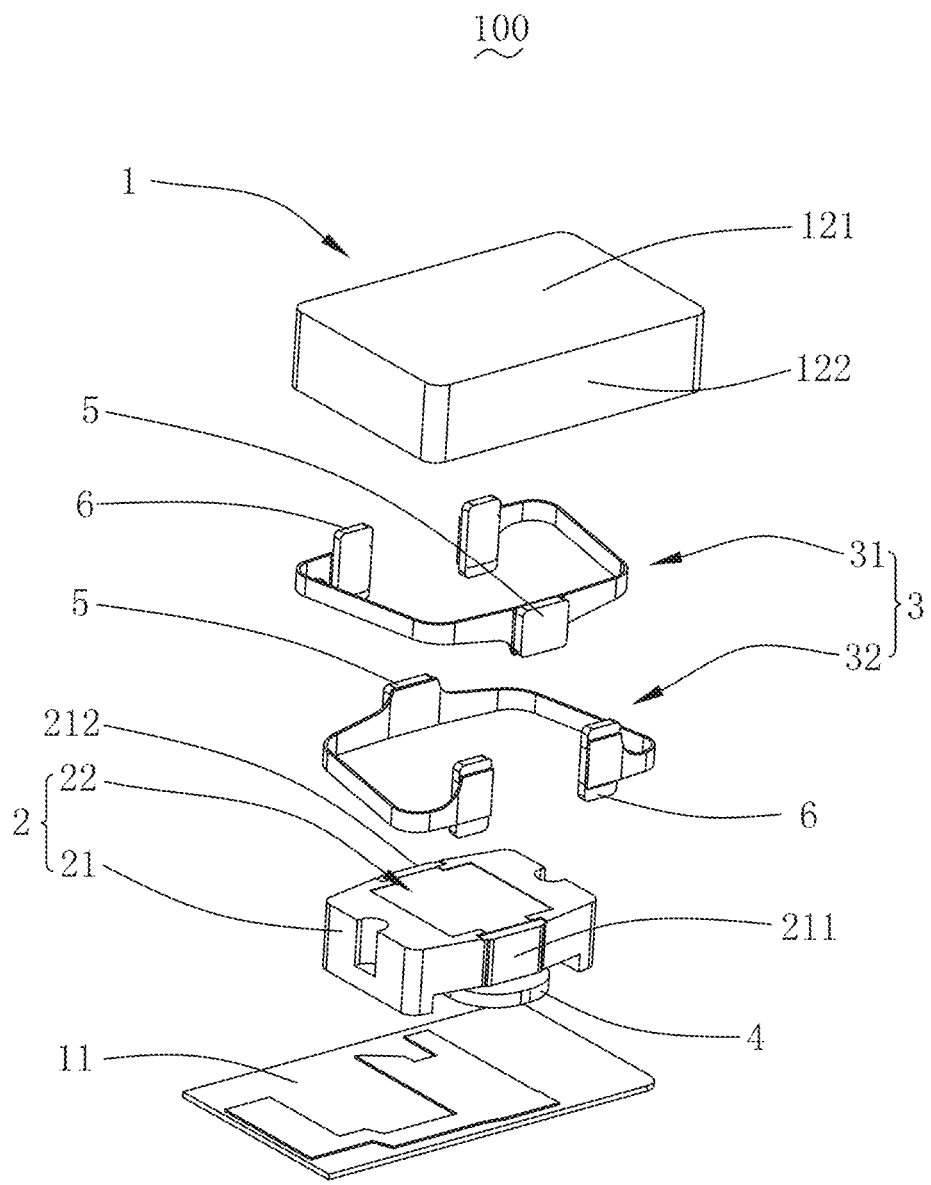
FIG. 1 is an exploded perspective structural diagram of a linear vibration motor in accordance with an exemplary embodiment of the present disclosure.
Figure 2:
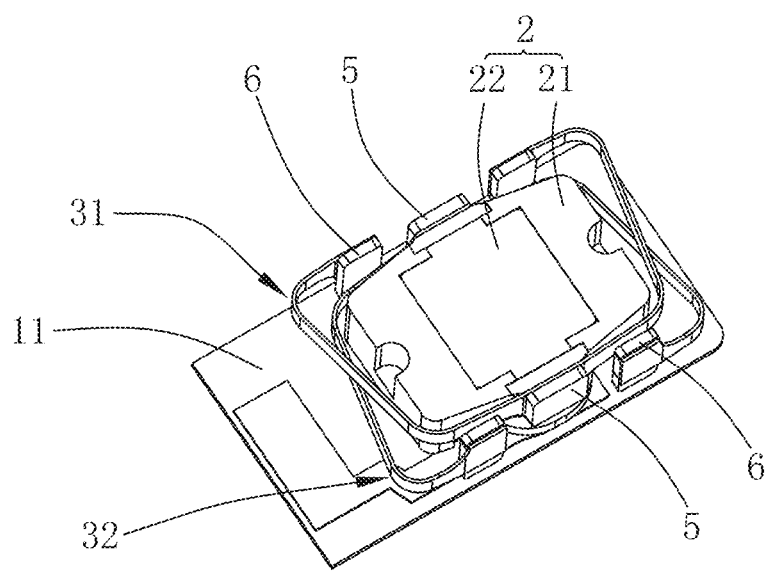
FIG. 2 is a partial perspective structural diagram of a linear vibration motor in accordance with an exemplary embodiment of the present disclosure.
Figure 2:
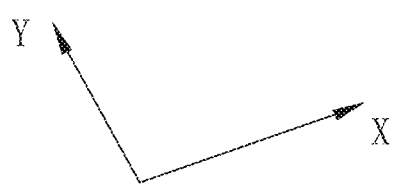

Referring to FIG. 1 and FIG. 2 at the same time, FIG. 1 is an exploded perspective structural diagram of a linear vibration motor in accordance with an exemplary embodiment of the present disclosure; a partial perspective structural diagram of a linear vibration motor in accordance with an exemplary embodiment of the present disclosure. The present disclosure provides a linear vibration motor 100, including a base 1 having accommodating space 10, a vibrating unit 2, an elastic member 3 fixing and suspending the vibrating unit 2 in the accommodating space 10, a coil 4 fixed at the base 1 and driving the vibrating unit 2 to vibrate, a first stopper 5 and a second stopper 6.

The base 1 includes a bottom plate 11 and a top cover 12 covering the bottom plate 11, the two together define the accommodating space 10.

The top cover 12 includes a top plate 121 arranged opposite to the bottom plate 11 and a side plate 122 bending and extending from the top plate 121 in a direction toward the bottom plate 11. In an exemplary embodiment, the base 1 is shaped as a rectangle, therefore, the side plate 122 is defined by four edges.

The vibrating unit 2 includes a weight 21 and a magnet 22 embedded in the weight 21. The vibrating unit 2 includes a first side wall 211 and a second side wall 212 oppositely arranged along a direction (Y-axis direction shown in FIG. 2) intersecting with the vibrating direction (X-axis direction shown in FIG. 2) of the vibrating unit. That is, the first side wall 211 and the second side wall 212 are located at two opposite sides of the weight 21.

Figure 3:
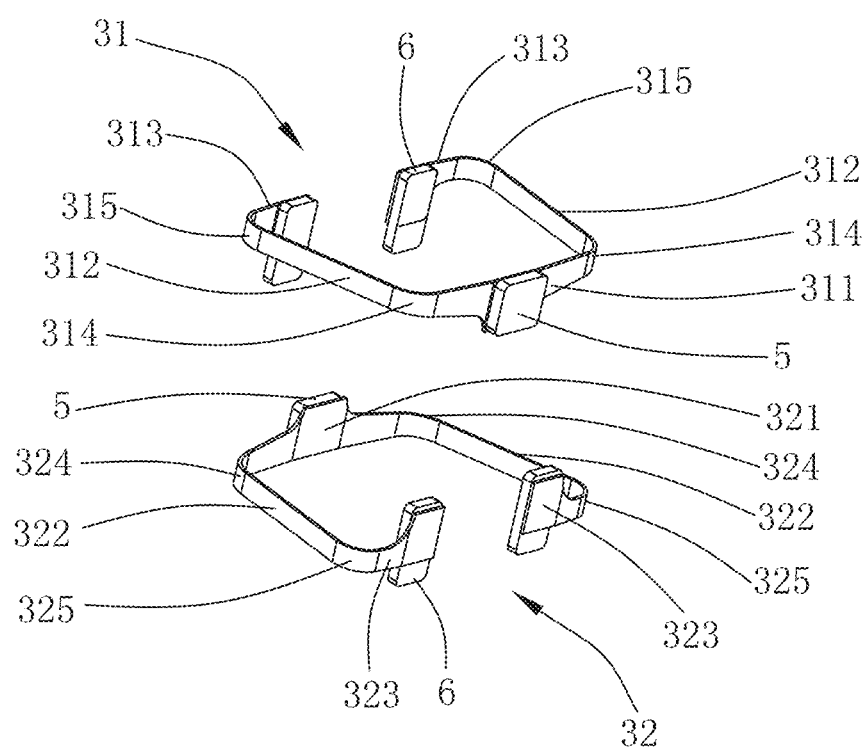
FIG. 3 is a perspective structural diagram showing cooperation of an elastic member, a first stopper and a second stopper of a linear vibration motor in accordance with an exemplary embodiment of the present disclosure.

Please refer to FIG. 3, which is a perspective structural diagram showing cooperation of an elastic member, a first stopper and a second stopper of a linear vibration motor in accordance with an exemplary embodiment of the present disclosure. The elastic member 3 includes a first elastic member 31 and a second elastic member 32 which are mutually spaced and form an assembled structure by stacking. The arrangement with double elastic members can make the vibrating effect of the linear vibration motor 100 be more balanced, thereby improving reliability.

In an exemplary embodiment, the first elastic member 31 and the second elastic member 32 have a same structure. When assembling, they provide space for each other and present an opposite arrangement in opposite directions, and are assembled by stacking, which is specifically implemented as follows:

The first elastic member 31 includes a first fixing arm 311 fixed at the first side wall 211, two first elastic arms 312 respectively bending and extending from two ends of the first fixing arm 311 and surrounding the vibrating unit 2, and two first connecting arms 313 respectively bending and extending from ends of the two first elastic arms 312 and surrounding the vibrating unit 2. Two first connecting arms 313 are respectively fixed at a side of the side plate 122 of the base 1 close to the second side wall 212, so that the vibrating unit 2 is suspended in the accommodating space 10.

The second elastic member 32 includes a second fixing arm 321 fixed at the second side wall 212 and located between the second side wall 212 and the first connecting arm 313, two second elastic arms 322 respectively bending and extending from two ends of the second fixing arm 321 and surrounding the vibrating unit 2, and two second connecting arms 323 respectively bending and extending from ends of two second elastic arms 322 and surrounding the vibrating unit 2. The two second connecting arms 323 are respectively fixed at a side of the side plate 122 of the base 1 close to the first side wall 211. The first fixing arm 311 is located between the first side wall 211 and the second connecting arm 323, so that the vibrating unit 2 is suspended in the accommodating space 10.

The above-mentioned structure allows the first elastic member 31 and the second elastic member 32 to form an assembled structure through being oppositely arranged in opposite directions. The first elastic arm 312 and the second elastic arm 322 provide space for each other, so that the first elastic member 31 and the second elastic member 32 are mutually spaced and not intersected in space. Therefore, a stacking structure in opposite directions is formed when assembling, which simplifies the assembling and improves the efficiency.

The coil 4 is fixed at the bottom plate 11, which is arranged facing and spaced from the magnet 22, the magnetic field formed by the coil 4 after being energized interact with the magnetic field of the magnet 22, so as to drive the vibrating unit 2 to move reciprocally and linearly, thereby generating vibrating effect.

The first stopper 5 is fixed at a side of the first fixing arm 311 away from the vibrating unit 2 and/or a side of the second fixing arm 321 away from the vibrating unit 2. In an exemplary embodiment, there are at least two first stoppers 5 respectively fixed at a side of the first fixing arm 311 away from the vibrating unit 2 and a side of the second fixing arm 321 away from the vibrating unit 2. The arrangement of such a structure improves fixing fastness of the elastic member 3 with the vibrating unit 2, so as to improve stability thereof. There are at least two second stoppers 6, the at least two second stopper 6 are respectively fixed at the first connecting arm 313 and/or the second connecting arm 323 adjacent to the first stopper 5, and are located at two opposite sides of the first stopper 5 in a direction (such as a central connecting line direction of the first fixing arm 311 and the second fixing arm 321) intersecting with the vibrating direction of the vibrating unit 2. That is, it is possible that the two second stoppers 6 can both be arranged close to the first side wall 211, and are respectively located at two opposite sides of the first stopper 5; it is also possible that the two second stoppers 6 can both be arranged close to the second side wall 212, and are respectively located at two opposite sides of the first stopper 5. Or, one second stopper 6 is arranged on the first connecting arm 313, the other second stopper 6 is arranged on the second connecting arm 323. Two first stoppers 5 are respectively arranged on the first fixing arm 311 and the second fixing arm 321. Two second stoppers 6 are arranged at two sides of the connecting line of the two first stoppers 5, so as to limit vibrating displacement of the vibrating unit 2.

In an exemplary embodiment, there are four second stoppers 6 respectively fixed on sides of the two first connecting arms 313 close to the second side wall 212 of the vibrating unit 2 and sides of the two second connecting arms 323 close to the first side wall 211 of the vibrating unit 2. In an exemplary embodiment, for the first stopper 5 and the second stopper 6 located at the same side of the vibrating unit 2, the first stopper 5 and the second stopper 6 are spaced from each other and an orthographic projection of the first stopper 5 along the vibrating direction at least partially falls into the second stopper 6, the distance between the first stopper 5 and the adjacent second stopper 6 is not larger than the effective elastic displacement of the elastic member 3. The arrangement of such a structure makes it possible that, when the linear vibration motor 100 is vibrating or dropping off along the vibrating direction, the second stopper 6 limits the first stopper 5, so as to limit the vibrating unit 2 from moving a large amplitude along the vibrating direction, and prevent the vibrating unit 2 from directly colliding with the base 1 to generate noises or cause the linear vibration motor 100 be malfunctioned, which improves reliability of the linear vibration motor 100.

In addition, the arrangement of the above-mentioned structure also reduces the number of limiting structure arranged at two sides of the vibrating direction of the vibrating unit 2, so as to reduce production cost and improve production efficiency.

In an exemplary embodiment, in order to allow the first elastic member 31 and the second elastic member 32 to achieve bending of a sufficient amplitude when respectively bending and surrounding the vibrating unit 2, and to generate a larger elasticity, the connecting position of the first fixing arm 311 and the first elastic arm 312 forms a first bending portion 314, and the connecting position of the first connecting arm 313 and the first elastic arm 312 forms a second bending portion 315; the connecting position of the second fixing arm 321 and the second elastic arm 322 forms a third bending portion 324, the connecting position of the second connecting arm 323 and the second elastic arm 322 forms a fourth bending portion 325.

Specifically, the first bending portion 314, the second bending portion 315, the third bending portion 324 and the fourth bending portion 325 are shaped as an arc structure.

Optionally, the first fixing arm 311 is parallel to the first connecting arm 313, the distance between the first bending portion 314 and the second bending portion 315 located at the same side of the vibrating unit 2 is less than the distance between the second bending portion 315 and the fourth bending portion 325.

In an exemplary embodiment, the first elastic member 31 and the second elastic member 32 are arranged in axial symmetry along the direction perpendicular to the vibrating direction. Optionally, after the first elastic member 31 and the second elastic member 32 are assembled, they represent a central symmetric arrangement.

Compared with the prior art, in the linear vibration motor of the present disclosure, two elastic members are stacked and arranged in opposite directions, the fixing arm of the elastic member is fixed on the vibrating unit, the connecting arm is fixed on the base, so that the vibrating unit is fixed and suspended in the accommodating space, the first stopper and the second stopper are respectively fixed on the fixing arm and the connecting arm located at same side of the vibrating unit, so that the first stopper is located between two second stoppers and the orthographic projection of the first stopper along the vibrating direction at least partially falls into the second stopper, so that when the linear vibration motor is dropping off along the vibrating direction, the second stopper limits the first stopper, thereby preventing the vibrating unit from directly colliding with the base, which improves reliability of the linear vibration motor. Moreover, the limiting components located at two sides of vibrating direction of the vibrating unit are removed, so as to improve production efficiency and reduce production cost.

The above is only the embodiments of the present disclosure, which will not limit the scope of the present disclosure, any equivalent structure or equivalent process transformation made according to the claim and drawings of the present disclosure, or directly or indirectly usage in other relevant technical fields, shall all be included in the protection scope of the present disclosure.

What is claimed is:

1. A linear vibration motor, comprising:
   a base having accommodating space;
   a vibrating unit; and an elastic member fixing and suspending the vibrating unit in the accommodating space;

wherein the vibrating unit comprises a first side wall and a second side wall oppositely arranged along a direction intersecting with a vibrating direction of the vibrating unit, the elastic member comprises a first elastic member and a second elastic member spaced from each other and arranged by stacking, wherein the first elastic member comprises a first fixing arm fixed on the first side wall, two first elastic arms respectively bending and extending from two ends of the first fixing arm and surrounding the vibrating unit, and two first connecting arms respectively bending and extending from ends of the two first elastic arms and surrounding the vibrating unit, the two first connecting arms are respectively fixed at a side of the base close to the second side wall;

the second elastic member comprises a second fixing arm fixed on the second side wall and located between the second side wall and the first connecting arm, two second elastic arms respectively bending and extending from two ends of the second fixing arm and surrounding the vibrating unit, and two second connecting arms respectively bending and extending from ends of the two second elastic arms and surrounding the vibrating unit, wherein the two connecting arms are respectively fixed at a side of the base close to the first side wall, and the first fixing arm is located between the first side wall and the second connecting arm;

the linear vibration motor further comprises:

a first stopper, and at least two second stoppers, wherein the first stopper is fixed at a side of the first fixing arm far away from the vibrating unit and/or a side of the second fixing arm far away from the vibrating unit;

at least two second stoppers are respectively fixed on the first connecting arm and/or the second connecting arm adjacent to the first stopper, and are located at two opposite sides of the first stopper in a direction intersecting with the vibrating direction of the vibrating unit;

for the first stopper and the second stopper located at the same side of the vibrating unit, the first stopper and the second stopper are spaced from each other and an orthographic projection of the first stopper along the vibrating direction at least partially falls into the second stopper, a distance between the first stopper and the adjacent second stopper is not larger than the an effective elastic displacement of the elastic member.

2. The linear vibration motor as described in claim 1, wherein the two second stoppers are both arranged close to the first side wall, and are respectively located at two opposite sides of the first stopper.

3. The linear vibration motor as described in claim 1, wherein the two second stoppers are both arranged close to the second side wall, and are respectively located at two opposite sides of the first stopper.

4. The linear vibration motor as described in claim 1, wherein the base comprises a bottom plate and a top cover covering the bottom plate, the top cover comprises a top plate arranged opposite to the bottom plate and a side plate bending and extending from the top plate in a direction toward the bottom plate, the first connecting arm is fixed at a side of the side plate close to the second side wall, the second connecting arm is fixed at a side of the side plate close to the first side wall.

5. The linear vibration motor as described in claim 4, wherein a connecting position of the first fixing arm and the first elastic arm forms a first bending portion, and a connecting position of the first connecting arm and the first elastic forms a second bending portion; a connecting position of the second fixing arm and the second elastic arm forms a third bending portion, and a connecting position of the second connecting arm and the second elastic arm forms a fourth bending portion.

6. The linear vibration motor as described in claim 5, wherein the first fixing arm is parallel to the first connecting arm, a distance between the first bending portion and the second bending portion is less than a distance between the second bending portion and the fourth bending portion.

7. The linear vibration motor as described in claim 6, wherein the first elastic member and the second elastic member are arranged in axial symmetry along a direction perpendicular to the vibrating direction.

8. The linear vibration motor as described in claim 6, wherein the first elastic member and the second elastic member are arranged in central symmetry.

9. The linear vibration motor as described in claim 6, wherein the first bending portion, the second bending portion, the third bending portion and the fourth bending portion are shaped in an arc structure.

* * * * *